US012753592B2

(12) United States Patent
Huang

(10) Patent No.: US 12,753,592 B2
(45) Date of Patent: Oct. 6, 2026

(54) FAUCET WITH SAFETY HANDLE

(71) Applicant: DAWNWAY ENTERPRISE CO., LTD., Taichung City (TW)

(72) Inventor: Wen-Shun Huang, Taichung (TW)

(73) Assignee: DAWNWAY ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 19/036,429

(22) Filed: Jan. 24, 2025

(65) Prior Publication Data

US 2026/0146425 A1 May 28, 2026

(30) Foreign Application Priority Data

Nov. 25, 2024 (TW) ................................ 113145545

(51) Int. Cl.
*E03C 1/04* (2006.01)
*F16K 35/02* (2006.01)

(52) U.S. Cl.
CPC .......... *E03C 1/0412* (2013.01); *F16K 35/025* (2013.01)

(58) Field of Classification Search
CPC ............................ E03C 1/0412; F16K 35/025
USPC .................................. 137/801; 251/95, 105
See application file for complete search history.

(56) References Cited

U.S. PATENT DOCUMENTS 5,183,073 A * 2/1993 Roberts .................. F16K 35/06 251/105
5,363,880 A * 11/1994 Hsieh .................... F16K 31/605 251/105
5,449,144 A * 9/1995 Kowalics ............... B67D 1/125 251/246
5,762,317 A * 6/1998 Frahm ................... F16K 35/025 251/105
6,962,319 B2 * 11/2005 Zheng .................. B67D 1/0878 222/509

* cited by examiner

*Primary Examiner* — John Bastianelli
(74) *Attorney, Agent, or Firm* — MUNCY, GEISSLER, OLDS & LOWE, P.C.

(57) ABSTRACT

A faucet comprising a rotating head, a safety handle for driving the rotating head to rotate, and a stopper located inside the rotating head. The safety handle includes a handle, a movable locking element and a compression spring disposed inside the handle, along with a nut screwed onto a top end of the handle, wherein the movable locking element includes a block that abuts against the nut, a pressing rod extending upward from the block, an upper shaft extending downward from the block and passing through the compression spring, and a lower shaft extending downward from the upper shaft. A button of the pressing rod protrudes outward through a hole in the nut. A restricting portion of the lower shaft is located within a limiting hole of the stopping element, and disengages from the limiting hole when the button is pressed, allowing the handle to be rotated.

4 Claims, 5 Drawing Sheets

FAUCET WITH SAFETY HANDLE

BACKGROUND OF INVENTION

The present invention relates to a faucet, and more particularly, to a faucet with a safety handle.

PRIOR ART

Conventional faucets on drinking water supply devices are typically equipped with a safety handle that can only be rotated to an open position—allowing hot water to flow through the faucet—when its button is pressed. However, the button on the safety handle is often screwed onto the top of a movable member. With repeated pressing, the button may gradually loosen from the top of the movable member, potentially leading to instability or even detachment. Additionally, conventional safety handles commonly have issues with complex structures and difficulty in assembly, which requires improvement.

SUMMARY OF THE INVENTION

The present invention provides a faucet with a safety handle to address one or more problems of the prior art. More specifically, the faucet includes a base, a water outlet connected to the base, a control valve disposed within the base, a rotating element mounted on the control valve, a stopping element fixed on the control valve, a handle fixed on the rotating element, a nut threaded to the handle, and a movable member and compressing spring deposited inside the handle.

The control valve includes a valve body fixed within the base and a valve stem connected to the valve body. The rotating head includes an inner sleeve tightly fitted on the valve stem, an outer sleeve surrounding the inner sleeve, a side wall supporting both the inner sleeve and the outer sleeve, an annular gap formed between the inner sleeve and the outer sleeve, an indentation formed on the inner sleeve, and a bolt. The stop element includes an annular base fixed to the valve body, a cylinder protruding from the annular base, a restricting hole passing through the cylinder, a first channel passing through the cylinder and communicating with the restricting hole and a second channel passing through the cylinder and aligned with the first channel, wherein the cylinder inserts into the annular gap of the rotating head and the restricting hole is aligned with the indentation of the inner sleeve. The outer sleeve of the rotating head inserts into the base while the annular gap of the rotating head receives the cylinder of the stopping element. The bolt passes through the second channel of the stopping element, with its two parts screwed into the inner sleeve and the outer sleeve, wherein one end of the bolt presses against the valve stem of the control valve.

The handle is fixed to the outer sleeve of the rotating head and includes a screw hole, an upper channel located below and communicating with the screw hole, a lower channel located below and communicating with the upper channel, an annular wall formed at the junction of the upper channel and the lower channel wherein the inner diameter of the lower channel is smaller than that of the upper channel and aligned with the aligned with the restricting hole of the stopping element.

The nut includes a cap, an outer thread section extending downward from the cap, and a vertical through hole passing through both the cap and the outer thread section, wherein the outer thread section is threaded into the screw hole and the vertical through hole communicates with the upper channel of the handle.

The movable member is integrally formed and includes a block located within the upper channel of the handle, a pressing rod extending upward from the block and passing through the vertical through hole of the nut, an upper shaft extending downward from the block and passing through the upper channel of the handle, and a lower shaft extending downward from the upper shaft and passing through the lower channel of the handle wherein the outer diameter of the block is larger than that of the pressing rod and that of the upper shaft. The pressing rod includes a button protruding from the vertical through hole of the nut. The lower shaft includes a shaft section located within the lower channel of the handle, a neck extending downward from the shaft section, and a restricting section extending downward from the neck and entering the restricting section within the restricting hole of the cylinder. The outer diameter of the neck is smaller than the inner diameter of the restricting hole and the width of the first channel of the stopping element. The outer diameter of the restricting section is smaller than the inner diameter of the restricting hole but larger than the width of the first channel.

The compressing spring is located within the upper channel of the handle, wherein the two ends of the compressing spring respectively abuts against the block of the movable member and the annular wall of the handle.

In one embodiment, the outer diameter of the upper shaft of the movable member of the present invention is larger than the inner diameter of the lower channel of the handle.

In one embodiment, the handle of the present invention includes an upper section and a lower section extending downward from the upper section. The upper section includes a screw hole and the upper channel. The lower section includes a lower channel. The outer diameter of the lower section is smaller than that of the upper section.

In one embodiment, the thickness of the side wall of the rotating head of the present invention is greater than the thickness of the outer sleeve.

DETAILED DESCRIPTION OF THE INVENTION

Figure 1:
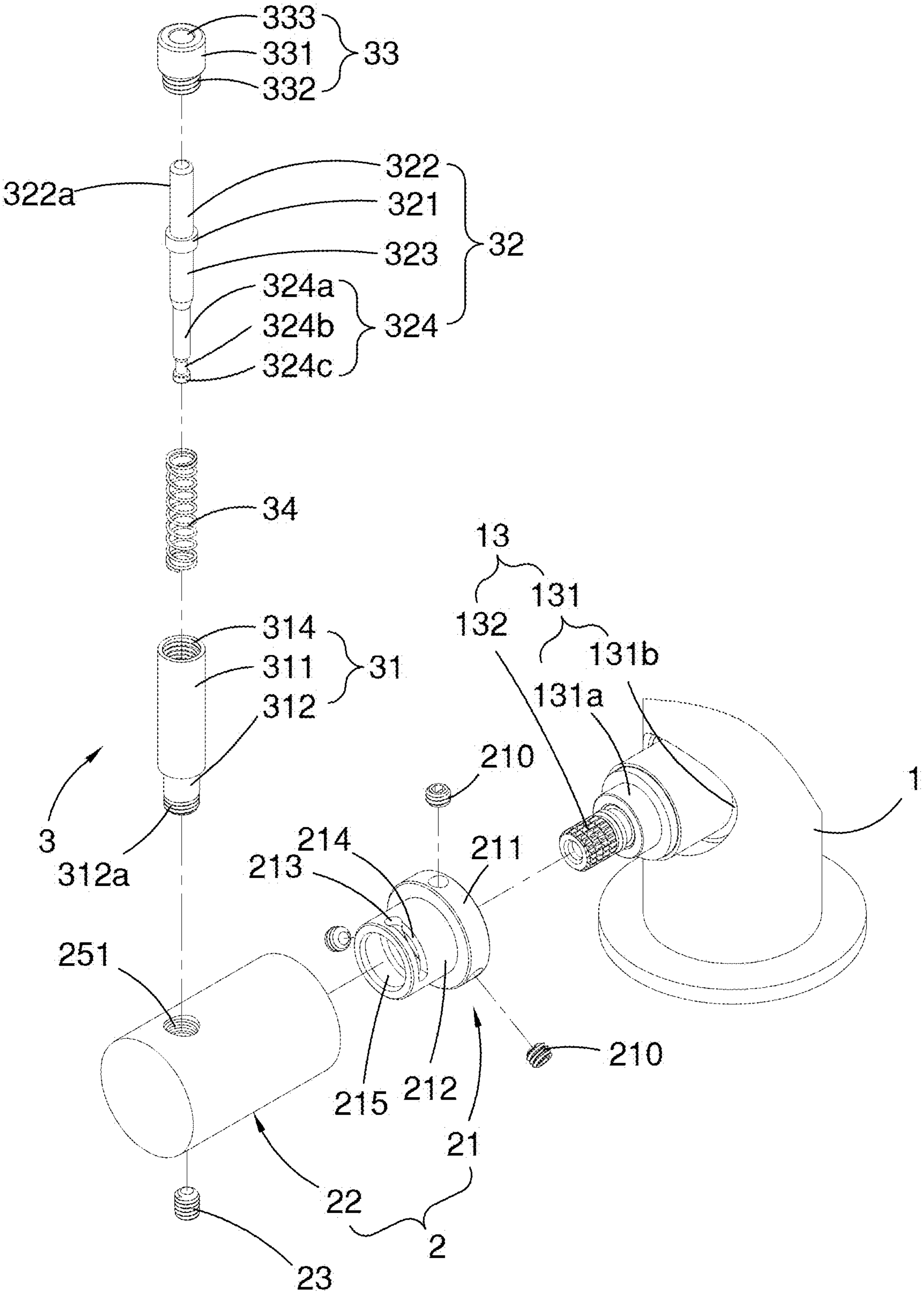
FIG. 1 is an exploded perspective view of a preferred embodiment of the faucet of the present invention.
Figure 2:
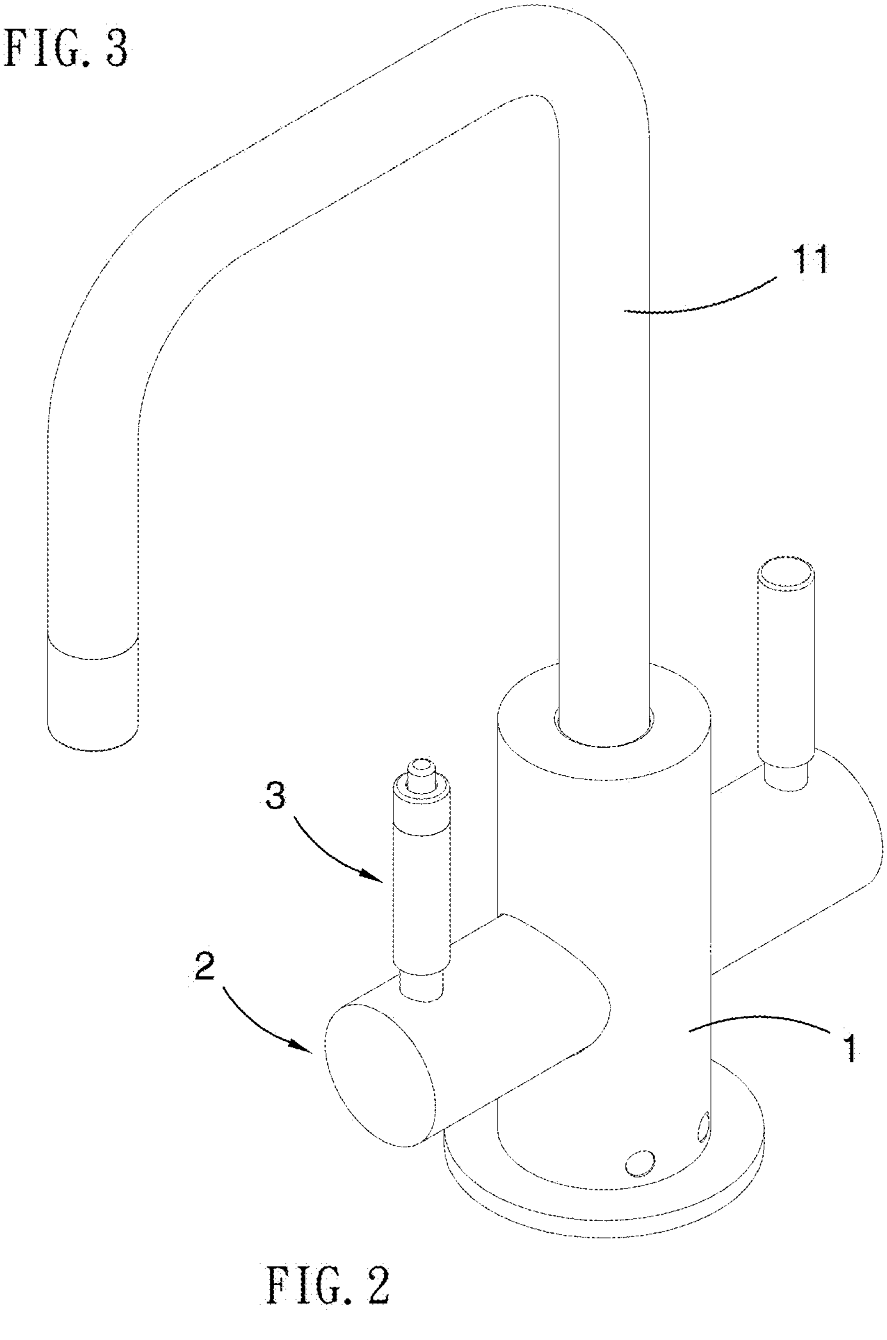
FIG. 2 is a perspective view of the preferred embodiment of the present invention.

FIGS. 1 and 2 illustrate an embodiment of the faucet according to the present invention. In this embodiment, the faucet includes a base 1 that can be fixed on a countertop (not shown in the figures), a water outlet 11 connected to the base 1, a control valve 13 disposed within the base 1, a rotating element 2 mounted on the control valve 13, and a safety handle 3 connected to the rotating element 2.

The base 1 is configured to receive a fluid, and the water outlet 11 is configured to allow the fluid to flow. The fluid is preferably hot water but is not limited thereto. The control valve 13 includes a valve body 131 and a valve stem 132 connected to the valve body 131. A back section 131*b* of the valve body 131 is fixed within the base 1, while a front section 131*a* of the valve body 131 is located outside the base 1. The valve stem 132 is also positioned outside the base 1. The valve stem 132 can be rotated to an open position and a closed position. The valve body 131 permits fluid to flow into the water outlet 11 when the valve stem 132 is in the open position and prevents fluid from flowing into the water outlet 11 when the valve stem 132 is in the closed position. The fluid enters through an inlet end of the water outlet 11 and exits through an outlet end.

Figure 4:
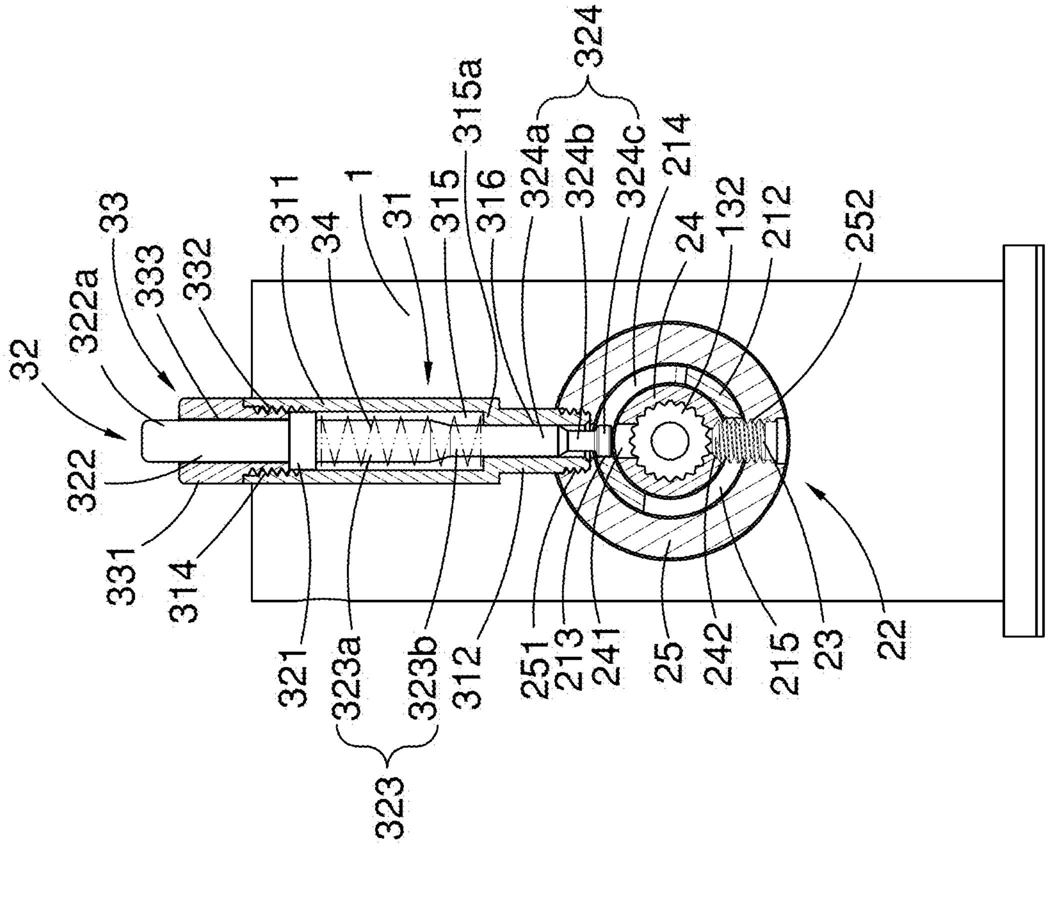
FIG. 4 demonstrates a cross-sectional schematic view of the preferred embodiment of the present invention.

The rotation element 2 includes a stopping element 21 and a rotating head 22. The stopping element 21 is located within the rotating head 22 and includes an annular base 211 fixed to the valve body 131, a cylinder 212 protruding transversely from the annular base 211 and surrounding the valve stem 132, a restricting hole 213 passing through the cylinder 212, and a first channel 214 passing through the cylinder 212 and communicating with the restricting hole 213. In this embodiment, the cylinder 212 is secured to the front section 131*a* of the valve body 131 by the annular base 211 and multiple bolts 210 (see FIG. 5). Preferably, the stopping element 21 also includes a second channel 215 passing through the cylinder 212. As shown in FIGS. 1 and 4, the first channel 214 extends along a circular path, with the cylinder 212's center as the center of the circle. The second channel 215 is located opposite to the first channel 214 and also extends along the circular path.

Figure 3:
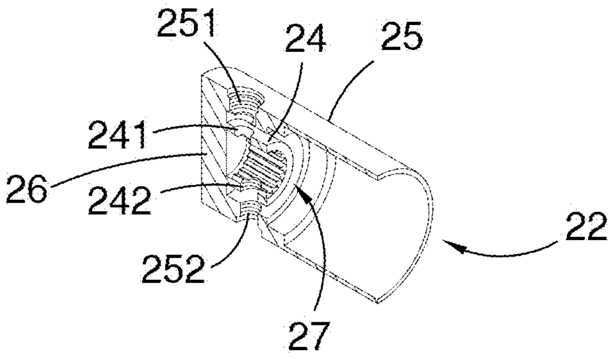
FIG. 3 is a perspective (partial cross-sectional) view of the rotating head of the preferred embodiment of the present invention.
Figure 5:
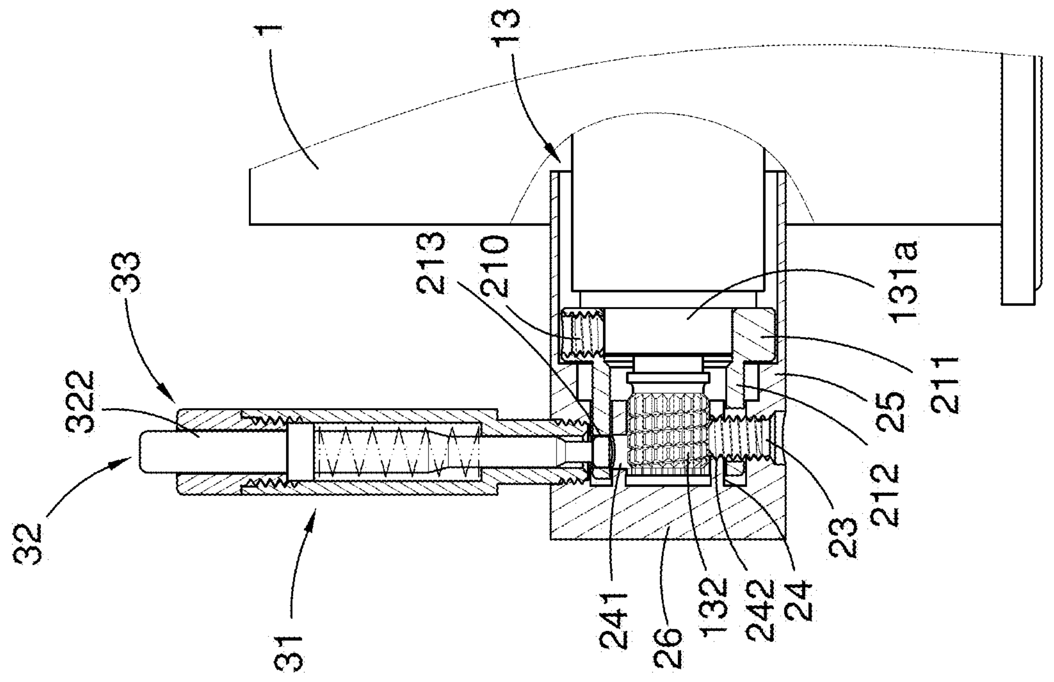
FIG. 5 is another cross-sectional schematic view of the preferred embodiment of the present invention.

The rotating head 22 is fixed to the valve stem 132 of the control valve 13. When the rotating head 22 rotates, it drives the valve stem 132 to either the open or closed position. In this embodiment, as shown in FIGS. 1 and 3, the rotating head 22 includes an inner sleeve 24 tightly fitted on the valve stem 132 of the control valve 13, an outer sleeve 25 surrounding the inner sleeve 24, a side wall 26 supporting both the inner sleeve 24 and the outer sleeve 25, which forms an annular gap 27 between the inner sleeve 24 and the outer sleeve 25, an indentation 241 on the inner sleeve 24, a first screw hole 242 passing through the inner sleeve 24, and a second screw hole 251 passing through the outer sleeve 25 and aligned with the indentation 241. Preferably, the rotating head 22 further includes a third screw hole 252 and a bolt 23, wherein the third screw hole 252 passes through the outer sleeve 25 and aligns with the first screw hole 242. As shown in FIGS. 4 and 5, the bolt 23 passes through a second channel 215 of the stopping element 21, with its two parts screwed into the first screw hole 242 of the inner sleeve 24 and the third screw hole 252 of the outer sleeve 25 while one end of the bolt 23 also presses against the valve stem 132 of the control valve 13. Preferably, the outer sleeve 25 of the rotating head 22 extends into the base 1. Furthermore, the thickness of the side wall 26 of the rotating head 22 is greater than the thickness of the outer sleeve 25.

As shown in FIGS. 1 and 4, the safety handle 3 includes a handle 31 fixed to the rotating head 22, a movable member 32 passing through the handle 31 and movable within the handle 31, a nut 33 threaded onto the handle 31, and a compressing spring 34 positioned inside the handle 31.

The handle 31 includes an upper section 311 and a lower section 312 extending downward from the upper section 311. The upper section 311 has a screw hole 314 and an upper channel 315 located below and communicating with the screw hole 314. The lower section 312 has a lower channel 316 located below and communicating with the upper channel 315. The inner diameter of the lower channel 316 is smaller than that of the upper channel 315 and is aligned with the restricting hole 213 of the cylinder 212. The upper section 311 further includes an annular wall 315*a* formed at the junction of the upper channel 315 and the lower channel 316. The lower section 312 also has an outer thread section 312*a* threaded into the second screw hole 251 of the rotating head 22. Additionally, the outer diameter of the lower section 312 is smaller than that of the upper section 311.

The nut 33 includes a cap 331, an outer thread section 332 extending downward from the cap 331, and a vertical through hole 333 passing through both the cap 331 and the outer thread section 332. The outer thread section 332 is threaded into the screw hole 314 of the upper section 311 of the handle 31. The vertical through hole 333 communicates with the upper channel 315 of the handle 31.

The movable member 32 is integrally formed and includes a block 321 located within the upper channel 315 of the handle 31, a pressing rod 322 extending upward from the block 321 and passing through the vertical through hole 333 of the nut 33, an upper shaft 323 extending downward from the block 321 and passing through the upper channel 315 of the handle 31 and the compressing spring 34, and a lower shaft 324 extending downward from the upper shaft 323 and passing through the lower channel 316. The outer diameter of the block 321 is larger than that of the pressing rod 322 and that of the upper shaft 323. The pressing rod 322 includes a button 322*a* protruding from the vertical through hole 333 of the nut 33. The lower shaft 324 includes a shaft section 324*a* located within the lower channel 316 of the handle 31, a neck 324*b* extending downward from the shaft section 324*a*, and a restricting section 324*c* extending downward from the neck 324*b* and entering the restricting hole 213 of the cylinder 212. The outer diameter of the neck 324*b* is smaller than the inner diameter of the restricting hole 213 of the cylinder 212 and smaller than the width of the first channel 214 of the cylinder 212. The outer diameter of the restricting section 324*c* is slightly smaller than the inner diameter of the restricting hole 213 but larger than the width of the first channel 214.

The compressing spring 34 is located within the upper channel 315 of the handle 31, with its two ends respectively abutting against the block 321 of the movable member 32 and the annular wall 315*a* of the upper channel 315. This configuration ensures that the block 321 abuts the bottom end of the outer thread section 332 of the nut 33, and making the block 321 to disengage from the bottom end of the outer thread section 332 (see FIG. 6) when the button 322*a* of the movable member 32 is pressed downward.

Figure 7:
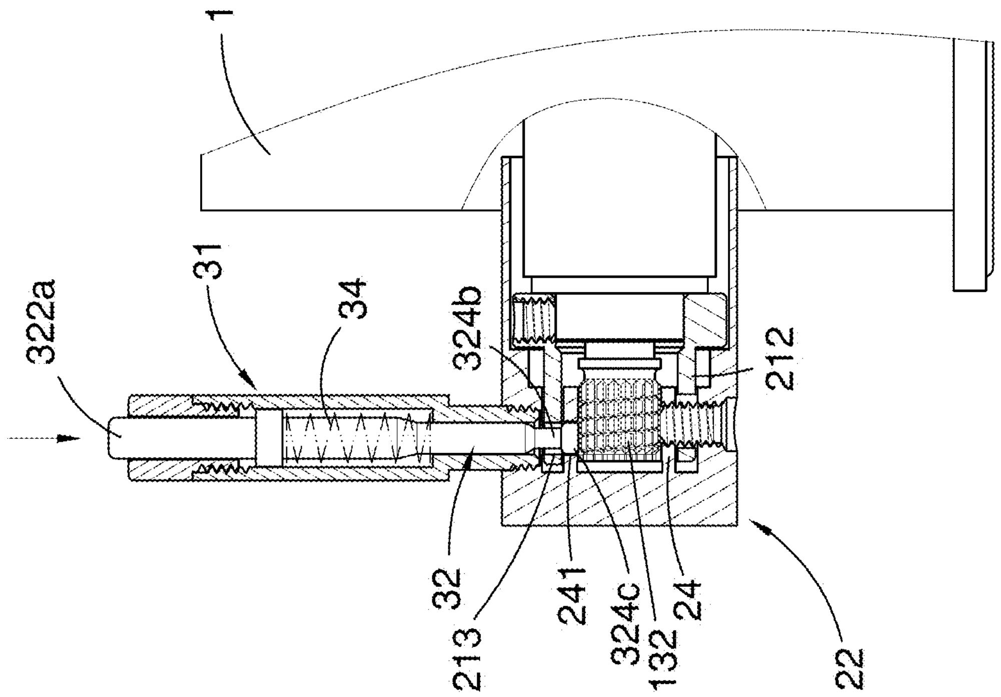
FIGS. 6 to 8 show schematic views of the operation of the preferred embodiment of the present invention.
Figure 6:
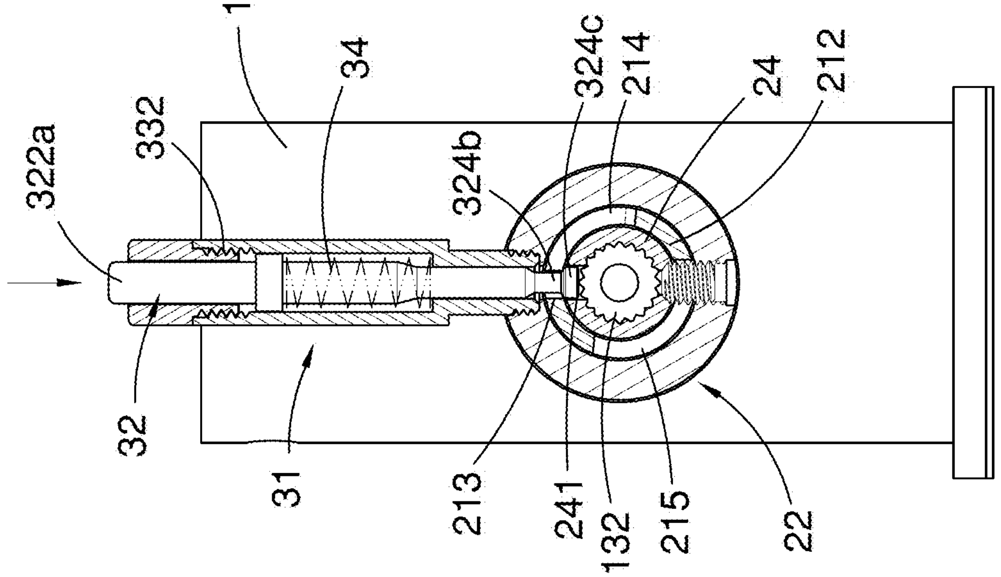
Figure 8:
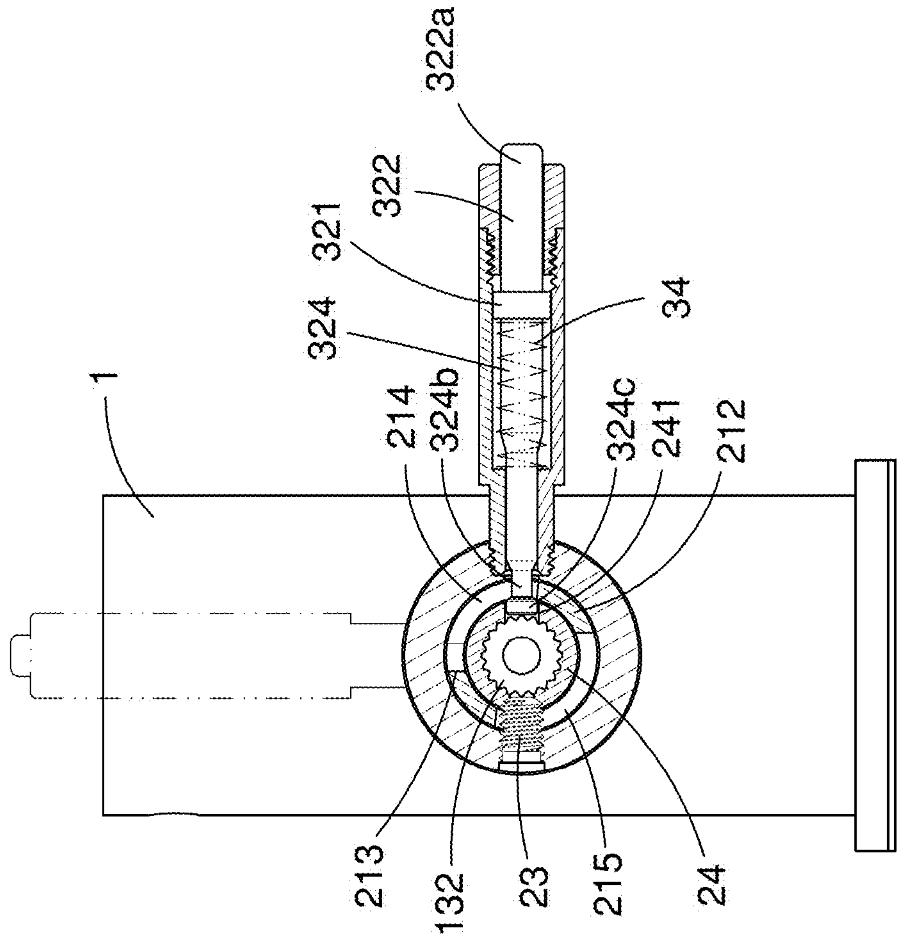

As shown in FIGS. 4 and 5, normally, the handle 31 cannot be rotated because the restricting section 324*c* of the movable member 32 within the handle 31 is located in the restricting hole 213 of the stopping element 21. As shown in FIGS. 6 and 7, when the button 322*a* is pressed downward, the entire movable member 32 moves downward by a certain distance, making the restricting section 324*c* of the movable member 32 disengaged from the restricting hole 213. At this point, as shown in FIG. 8, the handle 31 can be rotated from a first position to a second position. During the process of rotating the handle 31 to the second position, the handle 31 drives the rotating head 22, which drives the valve stem 132 from the closed position to the open position. During the rotation of the handle 31, the neck 324*b* moves along the first channel 214 of the cylinder 212 of the stopping element 21, while the bolt 23 moves along the second channel 215 of the cylinder 212.

When the button 322*a* is pressed downward, the compressing spring 34 is compressed by the block 321 and accumulates an elastic force. When the handle 31 is rotated back to the first position and the button 322*a* is no longer pressed, the compressing spring 34 pushes the block 321 upward by the elastic force, so that the entire movable member 32 moves upward back to its original position.

From the above description, the button 322*a* of the movable member 32 in the present invention does not need to be threaded to any parts of the movable member 32, so that there's no problem of the button 322*a* being loosened. Furthermore, the safety handle 3 of the present invention has the advantages of a simple structure and easy assembly, and the rotating element 2 has the advantage of a compact structure that is resistant to being loosened.

What is claimed is:

1. A faucet, comprising:

a base;

a water outlet connected to the base;

a control valve, including a valve body and a valve stem connected to the valve body wherein a back section of the valve body is fixed within the base while a front section of the valve body is located outside the base;

a stop element, including an annular base fixed to the valve body, a cylinder protruding transversely from the annular base, a restricting hole passing through the cylinder, a first channel passing through the cylinder and communicating with the restricting hole, and a second channel passing through the cylinder and aligns with the first channel;

a rotating head, including an inner sleeve tightly fitted on the valve stem, an outer sleeve surrounding the inner sleeve, a side wall supporting both the inner sleeve and the outer sleeve, an annular gap formed between the inner sleeve and the outer sleeve, and an indentation formed on the inner sleeve, wherein the outer sleeve inserts into the base while the annular gap receives the cylinder of the stopping element and the restricting hole is aligned with the indentation of the inner sleeve;

a bolt passing through the second channel of the stopping element, with a first part of the bolt screwed into the inner sleeve and a second part of the bolt screwed into the outer sleeve, wherein one end of the bolt also presses against the valve stem of the control valve;

a handle fixed to the outer sleeve of the rotating head and including a screw hole, an upper channel located below and communicating with the screw hole, a lower channel located below and communicating with the upper channel, an annular wall formed at the junction of the upper channel and the lower channel wherein the inner diameter of the lower channel is smaller than that of the upper channel and aligns with the restricting hole of the stopping element;

a nut including a cap, an outer thread section extending downward from the cap, and a vertical through hole passing through both the cap and the outer thread section, wherein the outer thread section is threaded into the screw hole and the vertical through hole communicates with the upper channel of the handle;

a movable member integrally formed and including a block located within the upper channel of the handle, a pressing rod extending upward from the block and passing through the vertical through hole of the nut, an upper shaft extending downward from the block and passing through the upper channel of the handle, and a lower shaft extending downward from the upper shaft and passing through the lower channel, wherein the outer diameter of the block is larger than that of the pressing rod and that of the upper shaft, the pressing rod includes a button protruding from the vertical through hole of the nut, the lower shaft includes a shaft section located within the lower channel of the handle, a neck extends downward from the shaft section, and a restricting section extends downward from the neck and entering the restricting hole of the stopping element while the outer diameter of the neck is smaller than the inner diameter of the restricting hole of the stopping element and smaller than the width of the first channel of the stopping element and the outer diameter of the restricting section is smaller than the inner diameter of the restricting hole but larger than the width of the first channel; and a compressing spring located within the upper channel of the handle, with two ends of the compressing spring respectively abutting against the block of the movable member and the annular wall of the handle.

2. The faucet of the claim 1, wherein the outer diameter of the upper shaft of the movable member is larger than the inner diameter of the lower channel of the handle.

3. The faucet of the claim 2, wherein the handle includes an upper section and a lower section extending downward from the upper section, while the upper section includes a screw hole and the upper channel, and the lower section includes a lower channel with the outer diameter of the lower section being smaller than that of the upper section.

4. The faucet of the claim 2, wherein the thickness of the side wall of the rotating head is greater than the thickness of the outer sleeve.

* * * * *